United States Patent [19]
Bridges

[11] Patent Number: 5,125,734
[45] Date of Patent: Jun. 30, 1992

[54] RANDOM ACCESS MODULE FOR SLIDE PROJECTOR

[75] Inventor: Mark E. Bridges, Spencerport, N.Y.

[73] Assignee: Eastman Kodak Company, Rochester, N.Y.

[21] Appl. No.: 633,489

[22] Filed: Dec. 27, 1990

[51] Int. Cl.⁵ .............................................. G03B 23/06
[52] U.S. Cl. ................................... 353/117; 353/111; 353/103; 353/25; 353/DIG. 5
[58] Field of Search ............... 353/117, 112, 111, 103, 353/DIG. 5, 110, 108, 25, 122;

[56] References Cited

U.S. PATENT DOCUMENTS 3,408,139 10/1968 Schwartz et al. ...................... 353/15
3,563,644 2/1971 Castedello et al. .................... 353/19

OTHER PUBLICATIONS

Fairchild Industrial Products Literature Describing Fairchild Instant Slide Selector (2 pages), Date Unknown.
Arion Corporation Literature Describing F588 Fader/Sensor (2 pages), Date Unknown.

Primary Examiner—William A. Cuchlinski, Jr.
Assistant Examiner—William C. Dawling
Attorney, Agent, or Firm—Marianne J. Twait

[57] ABSTRACT

A module interposed between a slide tray and a projector provides a user selected random presentation of sequentially ordered slides. The module bottom simulates the tray bottom to align gates of the module and projector. The module top simulates the tray bottom to align gates of the tray and module. A microcontroller controls a lifter foot to keep unwanted slides from dropping into the module gate until the tray had been rotated by a hub assembly to the next desired slide position. The lifter foot then acts to lower a slide through the module to the lifter foot and projector, and return it after projection.

20 Claims, 6 Drawing Sheets

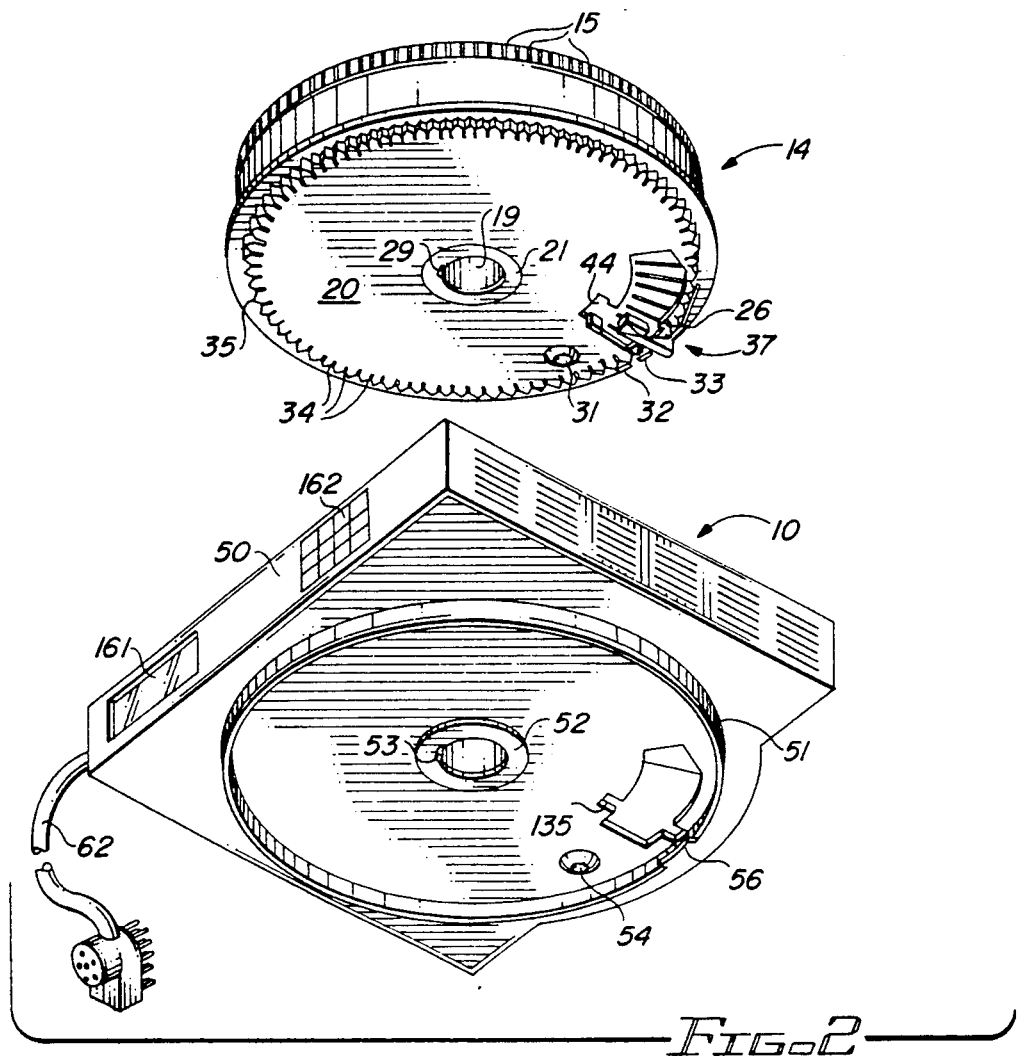
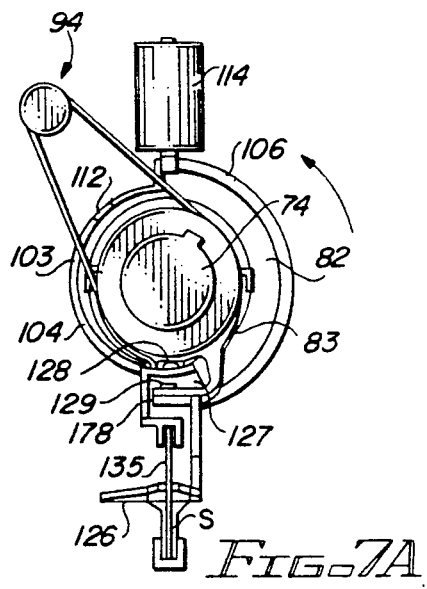 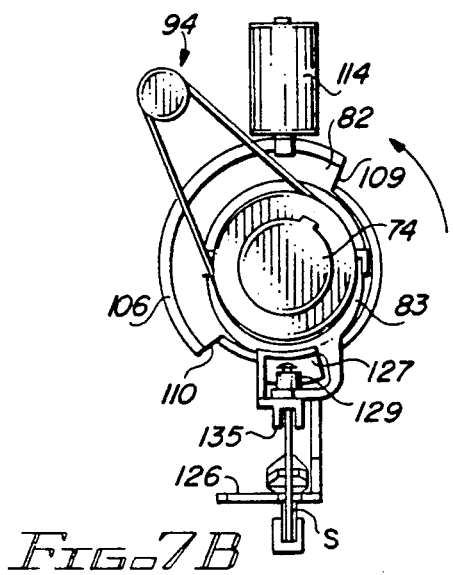

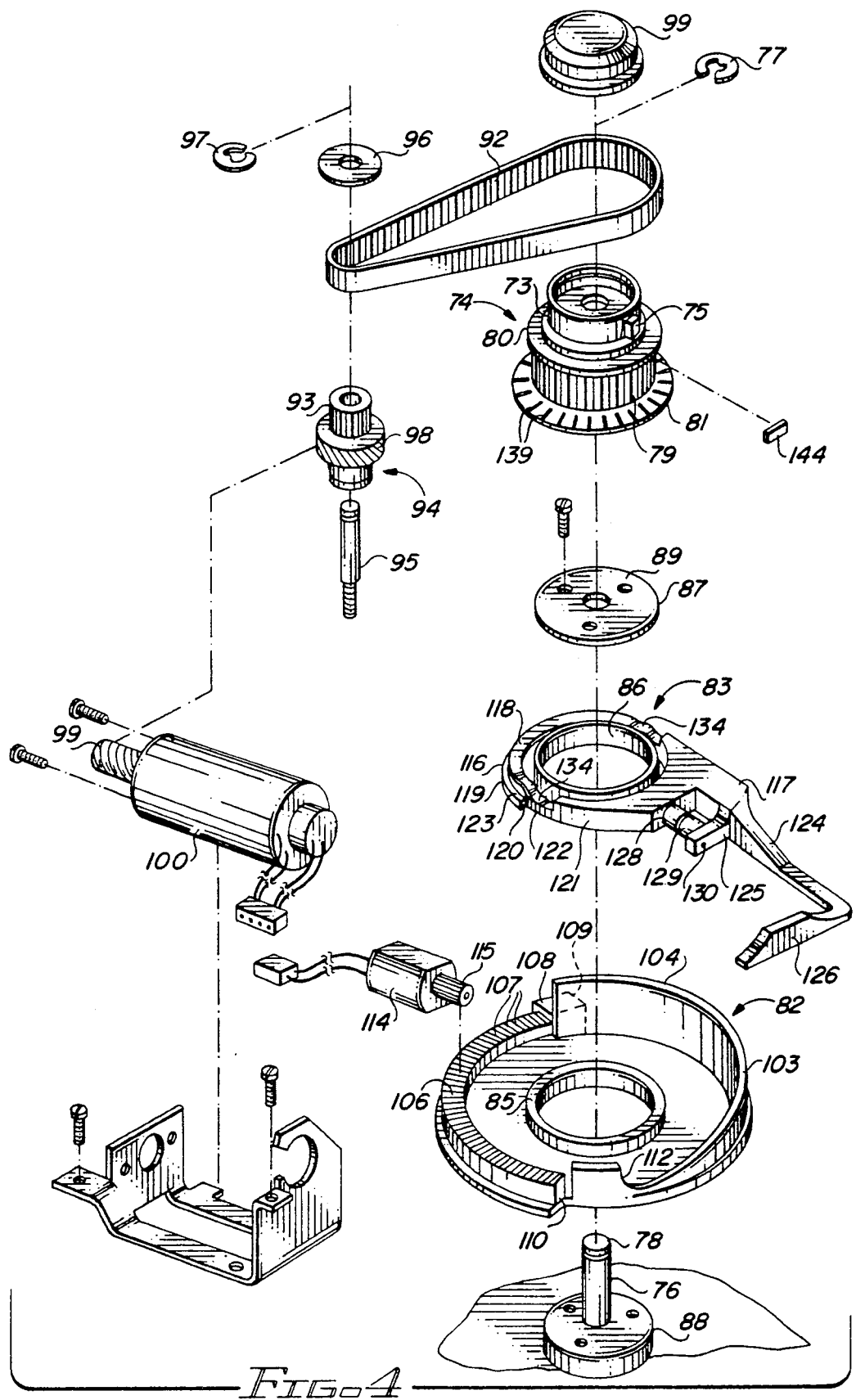

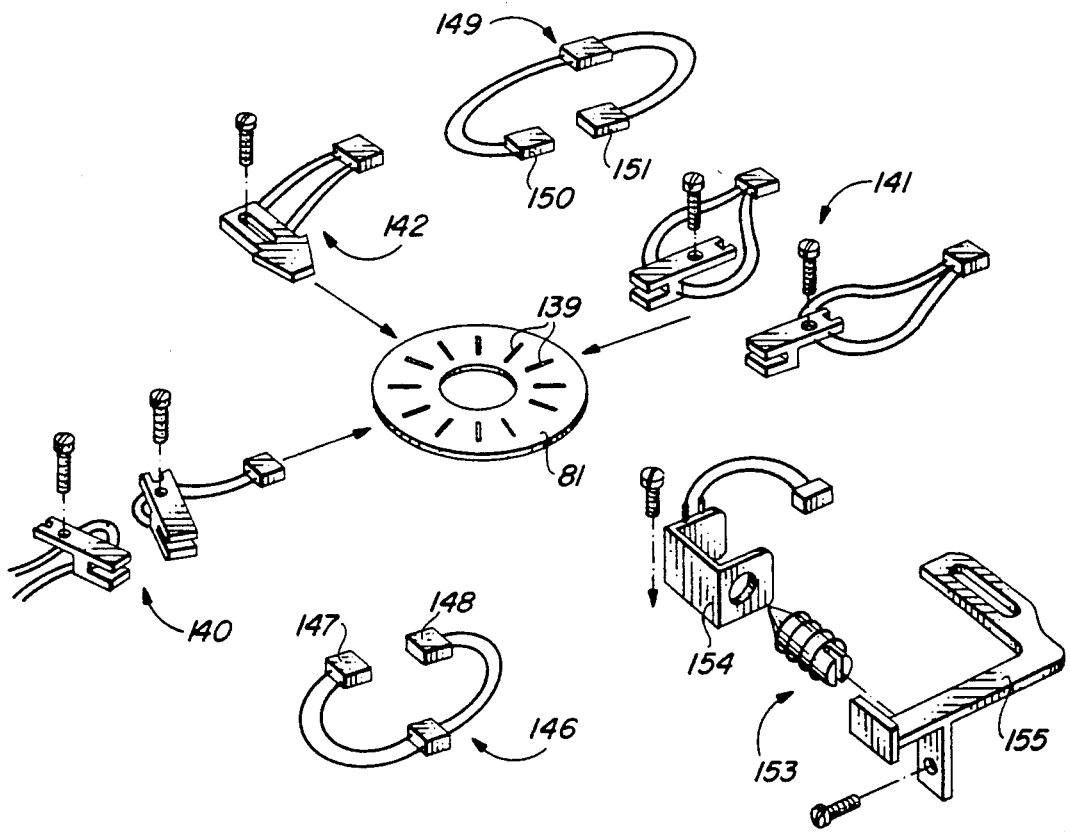
_Fig. 5_
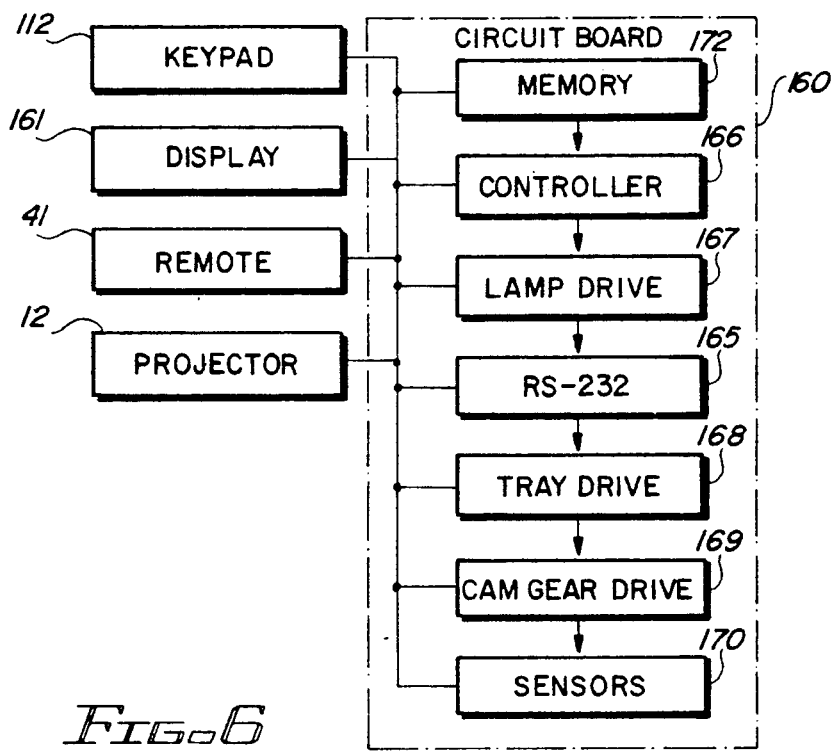
_Fig. 6_

RANDOM ACCESS MODULE FOR SLIDE PROJECTOR

TECHNICAL FIELD

This invention relates to a module that can be interposed between a slide projector and an associated slide tray for enabling a sequential physical ordering of slides in the tray to be randomly accessed for projection in accordance with a user selectable variable slide presentation sequence.

BACKGROUND ART

Conventional slide projectors, especially those intended for home consumption, are usually configured to access slides of an associated tray on a predefined basis in accordance with the sequential physical ordering of the slides in the tray. Slides must therefore be prearranged in the tray to match the desired slide projection sequence, in order to avoid having to cycle forwards or backwards through unwanted slides during the presentation. Should the desired projection sequence change from presentation to presentation, in order to have a smooth show it is necessary each time to rearrange the slides in the tray. If one or more slides are to be shown multiple times in a single presentation, duplicates must be placed at corresponding multiple locations in the tray. This not only incurs unnecessary duplication expense, but reduces the number of slots available for other slides in the same tray.

It is desirable to be able to randomly access the slides in a tray so that their presentation sequence may be varied, independent of physical positioning in the tray. Projectors that include built-in mechanisms for enabling random access to slides in a tray are known. Such projectors are, however, directed at the professional audio-visual market, rather than the amateur or home consumer, so tend to be expensive and complex.

An example of a conventional random access slide projector is the Kodak Ektagraphic TM RA960. It has a large controlling dial attached to a dedicated projector with provision for spinning a rotary tray by means of indexing pins located on the bottom of the tray. Sequence numbers for a show must be memorized or written down. Slides are manually accessed by turning the dial to a position corresponding to the slide's position in the tray.

Add-on devices also exist for converting existing projectors from sequential to random access systems. Such devices, however, require modification of existing trays and interface awkwardly with existing projector/tray connections. An example of such an add-on device is the Instant Slide Selector manufactured by Fairchild. The ISS device works with conventional projectors, such as the Kodak Carousel TM and Ektagraphic TM projectors, and consists of a selector unit that attaches to the side of the projector; a code ring that needs to be installed on top of the slide tray; and a remote control unit for entering a desired slide number.

There is a need for an inexpensive, convenient means for providing access on a user selectable random basis to the sequentially physically preordered slides in a tray, conventional projectors for home as well as professional use.

DISCLOSURE OF THE INVENTION

In accordance with the invention, apparatus is provided in the form of a module that can be interposed between a slide projector and an associated slide tray for enabling a sequential physical ordering of slides in the tray to be randomly accessed for projection in accordance with a user selectable slide presentation sequence. The module comprises a unit that interfaces with the mechanical and electrical components of a conventional projector to transport the tray and deliver slides from the tray to the projector in accordance with a presentation order, chosen independent of the preordering of the slides in the tray. In a preferred embodiment, described in greater detail below, means are provided for rotating a rotary tray to the next desired slide location position, for restraining delivery of slides to the projector gate pending attainment of that position, and for delivering the desired next slide through the module to the projector gate when the desired slide position is reached. Interaction of module components is controlled by means of an electrical circuit including a microprocessor; and programmable memory means is provided for predesignating a random slide presentation sequence.

BRIEF DESCRIPTION OF THE DRAWINGS

Embodiments of the invention have been chosen for purposes of illustration and description, and are shown in the accompanying drawings, wherein:

FIG. 2 is a bottom perspective view of the same module and slide tray;

FIG. 4 is an exploded view of the tray rotation and slide delivery components;

FIG. 5 is an exploded view of tray position and other module sensing elements;

FIG. 6 is a block diagram of an electronic circuitry suitable for use with the module; and FIGS. 7A-C, 8A-C and 9A-C are schematic top, side and front views, respectively, showing successive steps in the operation of the slide lifting mechanism of the module.

Throughout the drawings, like elements are referred to by like numerals.

MODE OF CARRYING OUT THE INVENTION

Figure 1:
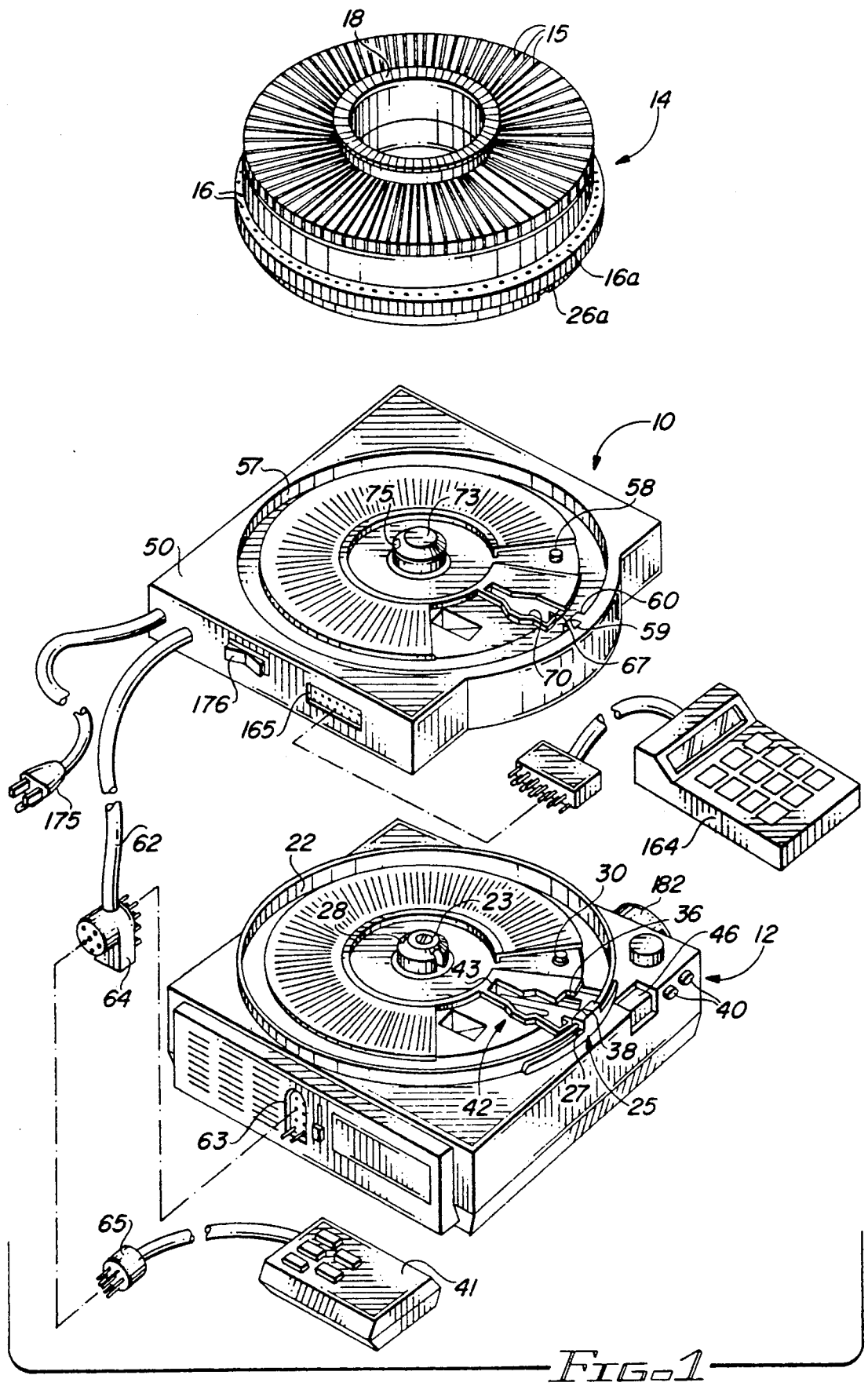
FIG. 1 is a top perspective view of a random access module in accordance with the invention showing its positioning for interposition between a conventional slide projector and an associated slide tray.

The principles of the invention are described with reference to an exemplary implementation of a random access module 10, shown in FIGS. 1 and 2, constructed to be interposed between a conventional slide projector 12 and an associated slide tray 14. The projector 12 may be of the top-loading, gravity-fed rotary tray type, such as a Kodak Carousel TM or Ektagraphic TM projector. The tray 14 may be a Kodak Carousel TM 80- or 140-slide tray having a continuous circular array of serially arranged vertical slots 15 adapted for the sequential physical ordering of 80 or 140 slides in side-by-side relationship therein. The slides are deposited into the slots 15 from above, one per slot 15, in a predefined sequence according to a numbering scheme identified by slide-identification numbers 16 molded circumferentially on the tray 14. The slides are prevented from spilling by a removable lock ring 18 that fits centrally on top of the tray. The bottom of the tray 14 includes a flat circular slide-retaining disk 20 rotatable about a central hub region 21 relative to the rest of the tray 14. The tray bottom and disk 20 are configured to cooperate with elements of a tray receiving recess 22 formed at the top of the projector 12 and into which the loaded slide tray is received.

In conventional usage, the tray 14 is placed into recess 22 so that a central opening 19 of hub 21 fits over an upwardly projecting center post 23 on the top of projector 12. The tray 14 is then revolved until a zero-position identification number 16a is brought opposite a gate index 25 on the projector 12. This brings marginal indentation 26 in the circumference of the base of tray 14 into alignment with a corresponding marginal projection 27 in the circumference of recess 22, permitting the tray 14 to drop into operating position on top of projector 12. When the tray 14 is in its zeroed position, a tray lock tab 28 extending radially outward from post 23 (FIG. 1) passes through a corresponding radially extending notch 29 of tray hub 21 (FIG. 2). a keying pin 30 projecting up from projector 12 mates with a corresponding keying aperture 31 presented in a depending dimple in tray disk 20, to fix the disk 20 against rotation relative to the recess 22.

The tray 14 includes, in known ways, tray release and pawl drive means for releasing and stepping the tray 14 by successive angular increments relative to disk 20 and projector 12, about the axis of post 23. Pawl fingers 32, 33 (FIG. 2) are movably mounted peripherally of disk 20 for cooperation with inwardly-facing teeth 34 of a ratchet track 35 located perimetrically of the tray 14, to rotate the tray 14 by step equivalent to one slot 15 in response to movement of a tray moving finger 36 (FIG. 1) located within recess 22 to contact the fingers 32, 33. A tray lock 37 (FIG. 2), including a radially-movable plunger normally outwardly biased into locking engagement with the track 35, prevents rotation of the tray 14 relative to disk 20 and projector 12 except when the plunger is moved inwardly by actuation of a tray movement releasing lever 38 (FIG. 1).

According to normal conventional usage of projector 12, switches 40 on the projector 12 or on a remote control unit 41 are actuated to move finger 36 and lever 38 to present slides from the tray 14 in serial fashion in forward or reverse direction for projection at a gate 42. The presentation sequence corresponds to sequential physical ordering of the slides in tray 14, with adjacent slides being presented one after another. A slide lifer foot 39 (see FIGS. 7C, 8C and 9C) in the projector 12 extends upwardly centrally through the gate top opening 43 to retain the slides in their respective slots 15 during rotation of slots 15 relative to the disk 20, past the corresponding gate opening 44 (FIG. 2) in the disk 20. When the next slot 15 is aligned with the respective gate openings 43, 44, the lifter foot 39 is lowered to retrieve the corresponding slide by gravitational action from its slot 15.

In the usual operation, the mounted tray 14 is advanced (or retreated) by successive angular amounts corresponding to the angular distance between adjacent slots, with the slide lifter foot 39 of the projector 12 being raised to keep the slides from dropping during each incremental advance, and being lowered to drop the slide into the gate 42. The slides are, therefore, presented sequentially to the projector for projection according to their order of placement in tray 14. Slides can be presented out of sequence, though only awkwardly. One way to do this automatically is to rapidly cycle through the slides intermediate the last shown slide and the next desired slide, showing the unwanted slides only momentarily, until the desired next slide is reached. Another possibility is to depress and hold down a "slide select" bar 46 (FIG. 1), then manually rotate the tray 14 until the number 16 of the next desired slide is opposite the gate index 25 on the projector 12. Holding the "select" bar 46 down maintains the lifter foot in its raised position to stop intermediate slides from dropping into the gate 42. When the bar 46 is released, the selected slide will drop down and be projected. Both the automatic rapid cycling and the manual tray rotation techniques cause interruption of the smooth presentation sequence. The manual rotation has the advantage of not requiring the projection of intermediate slides; however, it is easily subject to error. It is difficult to view the numerals 16, especially when they appear as black raised lettering on a black background in lighting dimmed for the show.

In accordance with the invention, the module 10 is inserted between the bottom of tray 14 and the top of the projector 12 to provide automatic means for randomly accessing the sequential physical ordering of slides in tray 14 in accordance with a variable, user-selectable slide show presentation sequence. The module 10 provides means for releasably retaining the slides in their slots 15 to keep unwanted slides from dropping into the projector gate 42 until the randomly user-selected next desired slide is brought into alignment with the gate 42, and means for automatically rotating the tray 14 to the slot 15 of that next desired slide over the gate 42.

Figure 3:
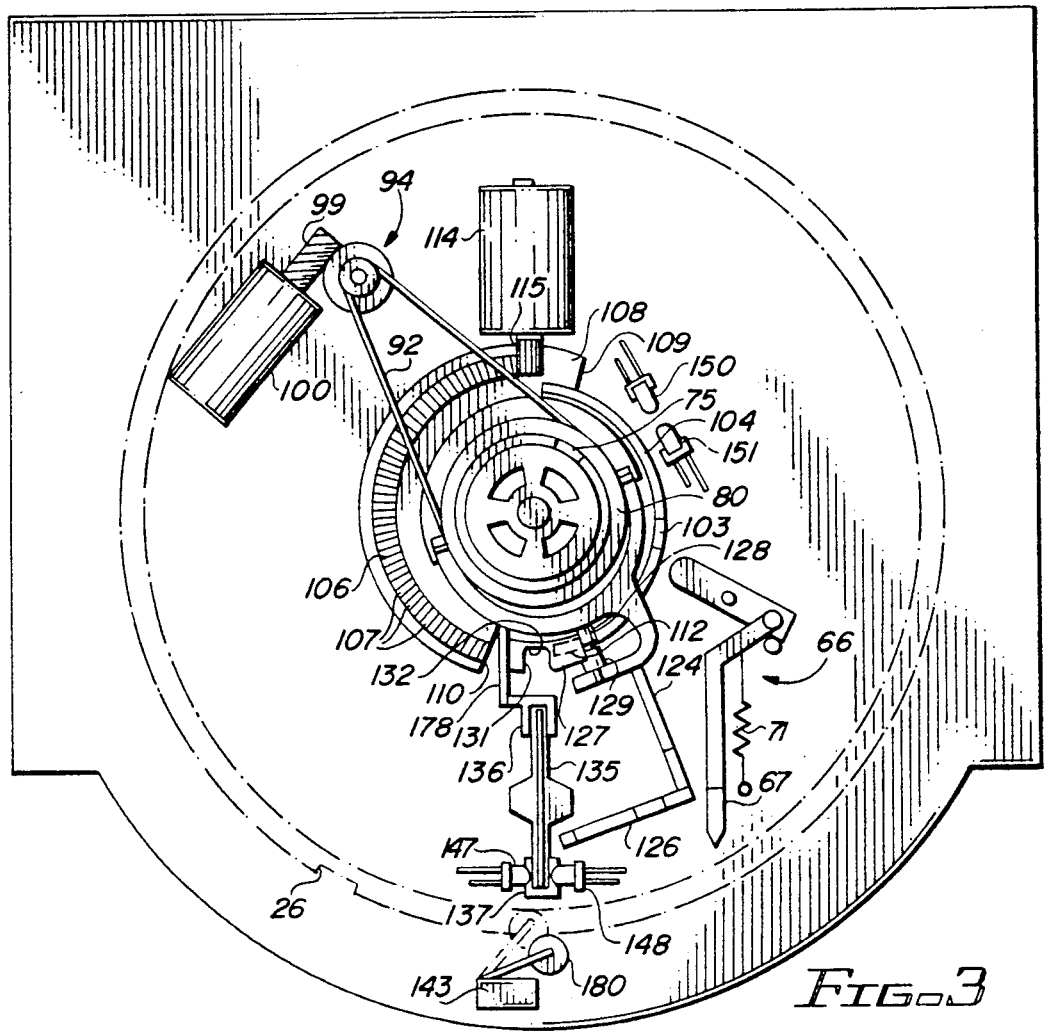
FIG. 3 is a top view, with portions removed, of the module.

As shown in FIGS. 1-3, the module 10 includes a housing 50 contoured to fit over and match the top of the projector 12. The base of the housing 50 includes means, such as a depending circular ring 51 (FIG. 2) and a depending central hub ring 52, resembling the bottom contour of the conventional rotary tray 14. A radial notch 53 located on hub ring 52 is configured to mate with radial tab 28 of projector post 23 (FIG. 1), and a keying aperture 54 on a depending dimple of housing 50 is configured to receive the upward projection of projector post 30. A marginal slot 56 is provided in ring 51 to match the gate indexing projection 27 of projector 12. Notch 53, aperture 54 and slot 56 serve the same purposes, respectively, as notch 29, aperture 31 and indentation 26 of tray 14, i.e., the assurance of proper orientation of module 10 relative to recess 22 of projector 12.

The top of module 10 is configured to resemble the top of the projector 12. A circular recess 57, similar to recess 22, is adapted for receiving the base of tray 14. Recess 57 (FIG. 1) includes an upwardly projecting tray-keying pin 58 located in the same position as the corresponding element 30 of projector 12. Pin 58 is designed to mate with the tray aperture 31. The module 10 has a gate index 59 on a marginal projection 60, corresponding to the projector index 25 on the projection 27. Module 10 also includes a cable 62 which connects by plug 64 into socket 63 of projector 12 to communicate the electronics of module 10 with the electronics of projector 12. As shown, plug 64 includes means for receiving the male end of the plug 65 of the conventional remote control 41 of the unit 12.

As shown in FIGS. 1 and 3, a tray interlock mechanism 66 with a tray releasing lever 67 is provided in correspondence with the tray interlock mechanism with finger 38 of the underlying projector 12. The mechanism 66 can be configured with lever 67 accessible at the module gate top opening 70 to work with the tray lock 37 in the same way as lever 38. The operation of lever 67 is described further below.

In accordance with the described embodiment, rotation of the tray 14 is achieved through means driving the hub 21 of the tray 14, rather than by activating the step-by-step pawl means 32, 33 in the periphery of the tray 14. The central opening of the tray hub region 21 (FIG. 2) is received over a protruding post portion 73 of a hub assembly 74 (FIG. 4), with a radial tab 75 keyed to the tray hub notch 29. The keyed post 73 serves to drive the rotation of the tray 14, as discussed further below.

The mechanism of the module 10 for lifting the slides and rotating the tray 14 is shown in FIGS. 3 and 4. Post 73 comprises the top of hub assembly 74 and projects through the top of housing 50 that forms the base of the recess 57. The hub assembly 74 is generally cylindrical in shape and mounts coaxially over a hub shaft 76 which is secured to the center of the inside of the base of housing 50. The assembly 74 is rotatably retained on shaft 76 by means such as an "E" ring 77 that fits within a groove 78 of the shaft 76. Below post 73, assembly 74 includes a circumferentially ribbed lower portion 79, bordered above by an annular flange 80 and below by a ring in the form of an encoder wheel 81. Portions of hub assembly 74 below the post 73 are normally concealed within the module housing 50.

A generally circular cam gear assembly 82 and a slide lifter assembly 83 are located rotatably coaxially about shaft 76, between the hub assembly 74 and the housing base. The cam gear assembly 82 includes a central ring portion 85 over the outside diameter of which the opening of a central circular collar portion 86 of the lifter assembly 83 is brought. The assemblies 82, 83 are held vertically fixed by a retainer cap 87 that fastens through the openings of ring and collar portions 85, 86 to the base of housing 50. Cap 87 includes a horizontally extending, enlarged circular upper end 88 that abuts the upper ring surface of collar 86 to capture the lifter 83 and cam gear 82 therebeneath. Post 76 extends up through a central bore 89 in end 88, enabling the assemblies 82, 83 to rotate about the post axis. The assembly 74 is coaxially captured on the same post 76, for rotation above the top surface of end 88, independently of any rotation of the underlying assemblies 82, 83. A hub cap 90 is snapped in place on hub 74 over the upper extremity of post 76.

Tray drive means, provided in the module 10 for rotating the tray 14 when the tray interlock 66 is released, comprises a timing belt 92 (FIG. 4) which fits around the ribbed periphery 79 of hub assembly 74 at one end of its path and at an opposite end around the top gear portion 93 of an idler gear/clutch assembly 94 that is mounted for rotation about an idler shaft 95 fixed in housing 50. The belt 92 is maintained against vertical displacement by the flange 80 and wheel 81 at one end, and at its other end by a flange 96 secured by an "E" ring 97 to an upper end of shaft 95 and a larger diameter lower gear portion 98 of the assembly 94. The gear 98 is positioned in mesh with a complementary gear 99 on the drive shaft of a tray drive stepping motor 100 which is mounted by a bracket 101 to the housing 50.

The cam gear assembly 82 (see FIG. 4) includes an upper cam surface 103 of constantly increasing elevation which extends for an arc of approximately 75 adjacent the periphery of assembly 82. Surface 103 is succeeded in the counterclockwise direction (viewed from above) by a dwell region 104 of constant elevation for an arc of approximately 125°. The portions 103, 104 follow a constant radial distance measured from the center of assembly 81. Angularly displaced from the cam surface 103 and dwell region 104 is a gear track 106 of approximately 120° arcuate extent, running peripherally of assembly 82 at a radial distance greater than that of surface 103 and region 104. A plurality of upwardly facing gear teeth 107 is disposed about the track 106. An untoothed extension 108 of the track 106 running annularly of a portion of dwell region 104, provides a clockwise rotation stop shoulder 109. The counterclockwise extreme of track 106 provides a counterclockwise rotation stop shoulder 110. The clockwise end of the cam surface 103 includes a rounded roller pocket 112. An electric motor assembly 114 is positioned in housing 50 adjacent the track 106, with a pinion 115 on the motor shaft located to drive the assembly 82 in rotation about the hub shaft 76 axis by meshing interengagement with the gear track 107.

The slide lifter assembly 83 comprises three parts: a lifter ring portion 116; a lifter foot portion 117 pivotally attached to the portion 116; and a spring 118 attached to the portion 116 and extending over the portion 117 to bias portion 117 into a downward position. The portion 116 comprises, in addition to the collar 86 described above, a semi-circular ring member 119 disposed annularly about the rear of collar 86 and including diametrically opposed split trunnion forming parts 120 that have aligned radial bores. The lifter foot portion 117 has a stirrup-like appearance. It includes an inner semi-circular ring portion 121 that circumscribes the front of collar 86 and has rearwardly-facing diametrically opposed free ends 122 that fit within the splits of member 119 and include radial bores aligned with the bores of member 119. Dowel pins 123 pass through the aligned bores of member 119 and ends 122 to pivotally attach the lifter portion 117 to the ring portion 116.

A lifter arm 124 extends radially outward from an intermediate portion of the ring portion 121. A roller support 125 extends clockwise from the rear of arm 124, in radially-spaced position away from ring portion 121. The inner surface of support 125 is configured to fit around a conically-shaped outer surface of a guide member 127 (FIG. 3). A lifter foot 126, having upwardly-sloped sides converging at a central raised portion, extends clockwise from the front of arm 124. The bottom of foot 126 abuts the top surface of the base of housing 50. A pair of rollers 128, 129 are supported in axially-spaced positions for independent free rotation about a pin 130 that extends radially through an "L"-shaped channel 131 of guide member 127, between the clockwise extreme of support 125 and the ring portion 121. Roller 129 is positioned to ride in a vertical part 131 of channel 131 during ascension and descension of the foot 126, and in a lower horizontal part 133 (FIGS. 9A-C) during counterclockwise retreat and clockwise advance of foot 126 from and toward the gate region. Guide member 127 serves to keep the foot 126 on track. The clockwise edge of guide channel 131 serves as a stop to limit clockwise movement of arm 124 and, thus, of assembly 83. The other roller 128 is disposed to ride on the cam track 103 and dwell region 104 as the cam gear assembly 82 is rotated. The spring 118 may be a horseshoe-shaped flat leaf spring attached to the upper surface of ring 119 and including free forward projections 134 that push down on the pivotal free ends 122 of ring portion 121 to bias the foot 126 into its lowermost position.

Guide member 127 is located so that the vertical channel part 132 opens radially toward a radial gate or slide opening 135 (see FIG. 3). The opening 135 extends vertically through the module 10. It is aligned at its top with the gate opening 44 of disk 20 of the mounted tray 14, and at its bottom with the gate opening 43 of projector 12. It is dimensioned to pass a slide by gravitational action from a slot 15 located at opening 44, through the module 10, to the gate of projector 12 for projection. Foot 126 is adapted to be raised to retain slides within the tray 14 until a desired next slide is brought over the opening 44 and, following projection, to lift a slide raised up into projector tray recess 22 by the projector lifter foot back into its slot 15 in the tray 14. The opening 135 is widened at its center as with conventional projector and tray gate openings, and is bordered at its inner and outer edges by vertically disposed slide track elements 136.

FIGS. 3 and 5 illustrate sensor components of the module 10. The encoder wheel 81 attached annularly at the base of the hub assembly 74 (FIG. 4) includes indicia 139 in the form of known angularly-spaced markings. Encoder sensors 140, 141 are positioned to read the indicia 139 of encoder wheel 81 as the hub assembly 74 is rotated to turn the tray 14. The sensors 140 are angularly-spaced and adapted to detect angular incrementation of a tray 14 in the form of an 80-slide tray; sensors 141 are angularly-spaced and adapted to do the same for a 140-slide tray. A hub zero-position detector 142 is located to optically identify the zero-position of the hub assembly 74 through a reflective element 144 (FIG. 4) affixed to the edge of flange 80 or edge of wheel 81. Another zero-position detector 143 (FIG. 3) is positioned to locate the zero-position notch 26 of tray 14 when tray 14 is rotated. An electrooptical detector 146, comprising LED 147 and photodetector 148 located on opposite sides of gate 135 (see FIG. 3), serves as a jam sensor to detect the presence of a slide within the gate 135. A similar electrooptical detector 149, comprising LED 150 and photodetector 151, serves to detect the presence of tray 14 in the recess 57. Various other sensors, such as sensor 153 having a solenoid 154 and slide 155, may be employed to detect mechanical movements such as the position of the tray interlock 66.

The random access module 10 sits atop any existing Kodak Carousel ™, Ektagraphic ™ or similar projector 12 by merely placing it within the recess 22 adapted to normally receive the tray 14. The tray 14 is then placed in the usual manner within the similar recess 57 of the module 10. The slide retaining means, tray releasing lever and tray rotating means are all housed within the module 10 along with motor control, lamp dimmer, jam detection and positional feedback circuitry. A block diagram of the circuitry for control of operation of the unit 10 is shown in FIG. 6.

The electronics may be housed in housing 50 on a circuit board 160 and connected by means of interfacing elements with external devices. Connection to projector 12 is made through cable 62 and plug 64 which connects to projector socket 63. The remote unit 41 may be connected to the same plug 64. A display 161 and keypad 162 may be located either on the housing 50 itself (see FIG. 2) or in a cable connectable handheld unit 164 (FIG. 1) to provide communications between the circuit 160 and the user. Interfacing with the unit 164 may be by dedicated cabling, or through the medium of an RS-232 communication link 165. The link 165 also serves for optionally establishing communications between the module 10 and a personal computer. Primary control functions are handled under supervision of a microcontroller 166 which is electrically connected to projector lamp drive 167, tray drive 168, cam gear drive 169 and sensor interfaces 170. A programmable memory 172 serves for programming a desired slide presentation sequence.

In operation, as mentioned, the module 10 can optionally be interfaced with a display/keypad arrangement 161, 162 or a personal computer. The user references a listing of the slides corresponding to the numbers 16 of the physical ordering of the slides in a particular slide tray 14. The slide number orders for the desired random access sequences for one or more shows are then entered and stored in memory 172. Each show and each tray can be given a separate identifying reference for later recall. Prompts may be used to request parameters, such as tray identification, slide number in tray, view time and fade code.

In operation, module 10 is placed on projector 12 with the tray perimeter simulating ring 51 brought into the projector tray receiving recess 22. Proper alignment is assured when projection 27, tab 28 and pin 30 (FIG. 1) are brought into registration, respectively, with slot 56, notch 53 and aperture 54. Tray 14 is then placed into recess 57 on the top of module 10, with projection 60, tab 75 and pin 58 brought into registration with indentation 26, notch 29 and aperture 31. The module 10 is thus placed with its gate 135 aligned with the gate 42 of the projector 12, and with the disk gate opening 44 above the module gate opening 70, with the zero-position slot 15 (indicated by numeral 16a) over the gate. The module plug 64 is mated with the projector socket 63.

Figure 8A:
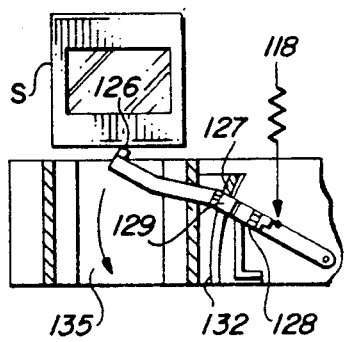
Figure 8B:
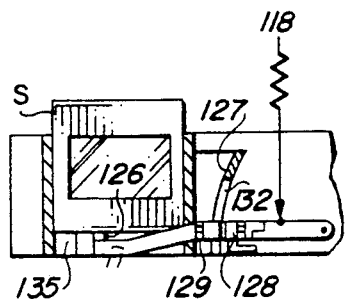
Figure 9A:
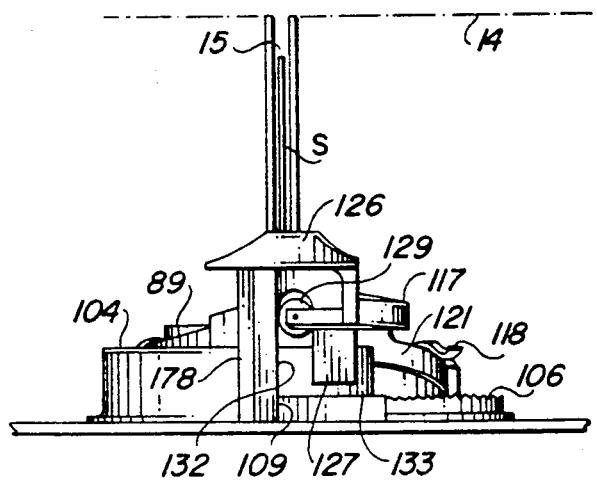
Figure 9B:
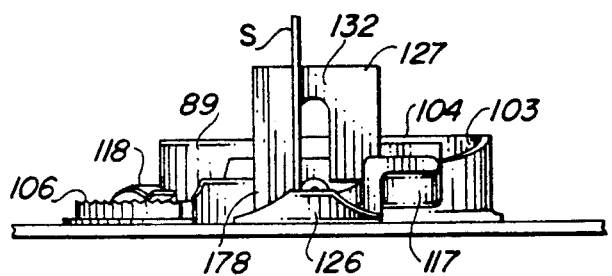
Figure 9C:
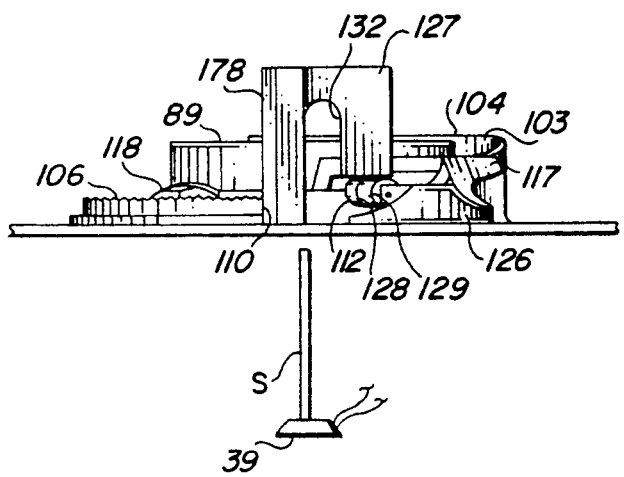

When power is applied to the module via a plug 175 upon actuation of an "on-off" switch 176 (FIG. 1), cam gear drive 169 (FIG. 6) is directed by microcontroller 166 to drive motor 114 (FIGS. 3 and 4) to rotate the cam gear assembly 82 clockwise about pin 76, through the intermeshing of pinion 115 and gear track 106. This action causes roller 128 of slide lifter assembly 83 to ride up the cam 103 and onto the dwell region 104, pivoting the lifter 117 upward about the pins 123 (FIG. 4) to thereby bring the lifter foot 126 into its uppermost position, as shown in FIGS. 7A, 8A and 9A. The roller 129 is moved up in the vertical part 132 of the channel 131 of guide member 127, and the stop shoulder 109 of extension 108 is brought into abutment against a post 178 of member 127. With the foot 126 thus raised into its slide-retaining position, the tray 14 can be rotated relative to its retention disk 20, without having the slides drop through the gate opening 44.

The presence of a tray 14 in the recess 57 is established by detector 149 which "looks" for the reflection of radiation from LED 150 off the bottom of the tray 14. If no reflective radiation is sensed, a message is displayed on the alphanumeric display 161 to request that a tray be placed on the module. Correct registration of the tray 14 is verified by sensors 143 (FIG. 5) and 142 (FIG. 3). If correctly positioned with tab 75 keyed to notch 29, reflective strip 144 will be sensed by electrooptical sensor 143 if the tray is in the zero position. If indentation 26 is aligned with projection 60, a roller 180 (FIG. 3) of sensor 142 which tracks the circumference at the base of tray 14, will be shifted inwardly from the solid to the dot-dashed position shown.

The circuitry 160 (FIG. 6) can be configured so that if the presence of the tray 14 is detected by sensor 149 but the tray 14 is not in the zero position, tray drive 168 can be actuated to control motor 100 to drive the tray 14 until one or both sensors 142, 143 detect alignment of the zero-position with the gate 135. The tray 14 is driven by turning the hub 74, which is keyed to tray 14 by tab 75, through movement of the belt 92 which extends around the hub ribbed portion 79. Tray size, either 80- or 140-count tray, can be determined by directing the emitter 150 of the tray sensor set 149 at a radial location on the underside of tray 14 to look for tray-specific identification markings. For example, 80-slide tray available from Kodak have three openings approximately 120° apart on a 3.5" diameter circle that are used to form detent features for the slide retaining ring 18 (FIG. 1). Thus, tray 14 may be rotated and the frequency and angular spacing of nonreflection locations sensed. If the proper sequence of interruptions in reflective radiation occurs during one revolution of the tray 14 (from zero position to zero position) the presence of an 80-slide tray can be confirmed. Absence of such markings signals that a 140-slide tray is present. More sophisticated schemes are also possible, such as the sensing of a user-applied bar code sticker which serves not only to identify tray type, but also the particular one of that tray type that is present. Comparison tray identification data can be prestored during programming of memory 172.

Once tray size is known, the appropriate step rate for the tray drive stepping motor 100 can be established. A microstepping circuit, well known in the motion control art, can be employed to provide sufficient torque to rotate the tray at a rapid speed, to easily alternate between the different incremental distances by which the tray perimeter must be driven to accommodate both sizes of slide trays through the same reduction ratio of the belt drive 92, and to compensate for system backlash. For a particular showing, a sequence of presentation previously stored in memory 172 may be accessed by entry of a show identification code. Alternatively, the sequence of presentation can be chosen slide by slide, in real time, while the presentation is underway.

The tray rotation mechanism is controlled responsive to indication of the next desired slide number, to drive the tray 14 by the shortest route, clockwise or counterclockwise, as determined by the microcontroller 166. The tray 14 is driven by rotation of the hub assembly 74, until the next selected slide is located directly above the module gate opening 70. The degree of angular rotation of the assembly 74 about post 76 needed to move to the next slide is controlled using rotational feedback information sensed from the rotating encoder wheel 81 by sensors 140, 141. Slides intermediate the slots 15 of the starting and ending rotational positions are prevented from dropping through the gate 135 of module 10 and into gate 42 of projector 12 by the raised foot 126.

Figure 7C:
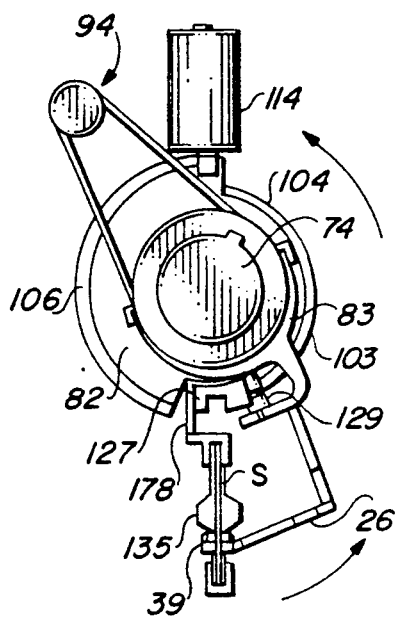
Figure 8C:
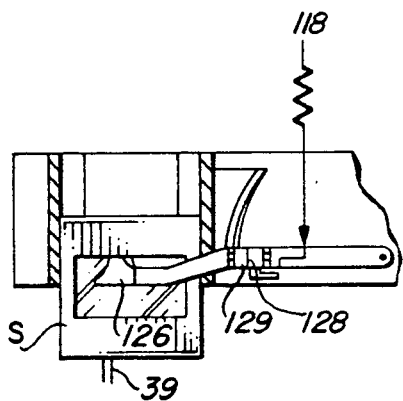

When the slot 15 for the desired slide S of tray 14 is positioned over the gate 135, the foot lowering and retracting sequence shown in FIGS. 7A-C, 8A-C and 9A-C is initiated to permit the slide to drop through the module 10 and into the gate 42 of the projector 12. With the foot 126 in its raised position, as indicated in FIGS. 7A, 8A and 9A, microcontroller 166 controls the cam gear drive 169 to energize cam servo motor 114 (FIGS. 3 and 4) to rotate the cam gear assembly 82 counterclockwise about the shaft 76. The lifter 117 of the slide lifter assembly 83 is biased downwardly by leaf spring 118. The cam roller 128 of the lifter 117 is, thus, biased to follow the contour of the dwell region 104 and cam 103 as the assembly 82 is rotated, and guide roller 129 is constrained by the vertical guide walls of the part 132 of guide member channel 131 to travel straight down therein, fixed against rotation with the assembly 82. As the assembly 82 moves counterclockwise, roller 128 moves down the cam 103 to the pocket 112, with roller 129 travelling vertically down in part 132 of guide member channel 131, bringing the foot 126 together with the selected slide S into the position shown in FIGS. 7B, 8B and 9B. A signal is then given to projector 12 to begin its normal slide changing sequence. As the projector slide lifter foot is coming up, the module lifter foot 126 is still descending.

When the cam roller 129 (and, thus, the lifter foot 126) reaches the bottom limit of its vertical travel, a roller stop (FIG. 4) formed by the clockwise edge of roller pocket 112 encounters the cam roller 128 and drives the guide roller 129 counterclockwise with the cam gear assembly 82 into the horizontal part 133 of the guide channel 131. The cam and lifter assemblies 82, 83 then continue to rotate together in the counterclockwise direction until the module lifter foot 126 is completely removed from the slide opening 135. The tray interlock mechanism 66 is configured with lever 67 pivotally arranged in housing 50 so that retreat of the foot 126 away from the gate 135 brings the lifter assembly 83 into contact to cause the lever 67 to be urged against the bias of a spring to precisely register the tray 14. Counterclockwise movement continues until the shoulder 110 (FIG. 4) is brought into abutment with the guide post 136. The module mechanism is now in the position shown in FIGS. 7C, 8C and 9C. The timing is such that when the module lifter foot 126 is clear of the slide opening 135, the projector slide lifter foot 39 is in a position to receive the slide S and lower it into the projection gate 42 in the usual manner. The slide S is detected by the projector 12 and the shutter opens, displaying the slide image by means of the projector lens 182 (FIG. 1).

To enable a slide change, the sequence of steps shown in FIGS. 7A-C, 8A-C and 9A-C is reversed. A signal is given to the projector 12 to begin its normal slide change. The shutter is closed and the slide S is driven upwards. When the projector lifter foot 39 begins to reach the top of its travel, the cam servo motor 114 is energized to drive the cam gear assembly 82 in the opposite clockwise direction. With the guide roller 129 constrained against vertical movement by the upper horizontal wall of the horizontal channel part 133, the cam roller 128 is contacted by the rising cam 103 to drive the lifter assembly 83 with the cam assembly 82 to bring the foot 126 under the returning slide and into the position shown in FIGS. 7B, 8B and 9B. The leading spatulate end of the module lifter foot 126 goes under the slide which is now at its zenith of travel, propelled by the projector lifter foot 39. The slide S is now held in the module slide guide 135 by the foot 126, and the projector slide lifter foot 39 is free to descend to its "slide-in-the-gate" position. (However, because no slide is sensed in the gate, the projector 12 does not open the projection shutter.) The module slide lifter assembly 82 continues to rotate with the cam assembly 83 until the guide roller 129 comes into contact with the clockwise wall of the channel 131, at the bottom of the channel vertical part 132. The roller 129 (and, thus, the lifter assembly 83) is now free to move vertically but is restrained from further clockwise horizontal movement. The cam roller 128 therefore rides up the cam surface 103 and onto the dwell region 104, bringing the lifter foot 126 back to the upper position shown in FIGS. 7A, 8A and 9A. The cam assembly 82 continues to rotate until the shoulder 109 again comes into contact with the gate post 178. The raising of foot 126 drives the slide S back into its tray slot 15. The cam servo motor 114 is deenergized, keeping the lifter foot in the slide opening 44 blocking position, and the tray interlock is withdrawn by the bias of spring 71 to unlock the tray 14. Stepping motor 100 can now be energized, as previously described, to move a next desired slide into position.

The microcontroller 166 provides control, through interface circuitry, of the projector 14 through the 7-pin control cable 62, in addition to controlling the module 10 itself. Projector functions that may be controlled include lamp dimming (fade), flash and on-off switching, slide-change cycle initiation, generation of 1 KHz signal to enable slide changes with ancillary automatic slide change equipment, and timing between slides. Module control functions include monitoring the sensors, alphanumeric display, keypad input decoding, tray and cam motor drive, and all other control requirements of the unit. Module 10 is provided with appropriate ducting to circulate temperature controlled air over the slides to treat them before projection, either with its own air circulating unit or by capturing and rechanneling air from the projector blower.

Those skilled in the art to which the invention relates will appreciate that other substitutions and modifications can be made to the described embodiment without departing from the spirit and scope of the invention as described by the claims below.

I claim:

1. A module for use with a slide projector and an associated slide tray for enabling a sequential physical ordering of slides in the tray to be randomly accessed for projection by the projector; the slide projector including means for mounting the tray, projector gate means for receiving a slide into the projector from the tray, and means for transporting a slide between the tray and the projector gate means; and the tray including tray gate means for dispensing one slide at a time from the tray, and means cooperable with the projector tray mounting means for assuring alignment of the tray gate means with the projector gate means; the module being characterized in that it comprises:

means cooperable with the projector tray mounting means for mounting the module on the projector in place of the tray;

means for mounting the tray on the module;

module gate means for passing a slide through the module;

means, cooperable with the projector tray mounting means and with the tray alignment assuring means, for establishing alignment of the module gate means with both the tray gate means and the projector gate means;

means cooperable with the tray for randomly selecting a desired one of the slides to be dispensed by the tray gate means; and means cooperable with the projector transport means for transporting the randomly selected one slide between the tray and the projector, through the module.

2. A module as in claim 1, wherein the slide tray includes an array of slide-receiving slots; the tray gate means comprises means, including a tray gate opening, for retaining slides in the slots except when a slot is aligned with the tray gate opening; and the means for randomly selecting comprises means for moving the array of slots relative to the means for retaining until the one slot corresponding to the desired one of the slides is aligned with the tray gate opening.

3. A module as in claim 2, wherein the module gate means includes an opening passing through the module; and the means for transporting the one slide through the module comprises a lifter foot and means for moving the lifter foot to deliver the one slide through the module gate opening from the tray to the projector, then back to the tray, when the one slot is aligned with the tray gate opening.

4. A module as in claim 3, wherein the projector means for mounting the tray comprises means for mounting the tray above the projector for gravitational feed of the one slide from the tray to the projector when the one slot is aligned with the tray gate opening, the means for mounting the module comprises means for mounting the module above the projector in place of the tray; the means for mounting the tray on the module comprises means for mounting the tray above the module; and the means for moving the lifter foot comprises means for positioning the lifter foot to prevent the gravitational feed of slides from the tray until the one slot is aligned with the tray gate opening.

5. A module as in claim 4, wherein the means for moving the lifter foot further comprises means for moving the lifter foot in the module gate opening to move the one slide between the tray and the module, and means for removing the lifter foot away from the module gate opening to move the one slide between the module and the projector.

6. A module as in claim 2, wherein the module further comprises sensor means for sensing the position of the array of slots; and user-input means, cooperative with the sensor means, for controlling the means for moving the slots to define the order of sequential alignment of the slots with the tray gate opening.

7. A module as in claim 6, wherein the module further comprises a control circuit including a microcontroller; the sensor means is connected to the microcontroller; and the user-input means comprises a memory device and an input device connected to the microcontroller and the memory device.

8. A module as in claim 7, wherein the projector has a control circuit, and the module further comprises interface circuit means for connecting the microcontroller to the projector control circuit, to coordinate the projector means for transporting with the module means for transporting.

9. A module for use with a slide projector of the top-loading, gravity-fed rotary tray type and an associated slide tray having a continuous circular array of serially arranged vertical slots adapted for the sequential physical ordering of slides respectively therein, for enabling the tray-loaded slides to be randomly accessed for projection by the projector in accordance with a user-selectable slide presentation sequence; the slide projector including means for mounting the tray above the projector, projector gate means having a projector gate opening for receiving a slide into the projector from the tray, and projector lifter foot means cooperable with the projector gate opening for transporting a slide between the tray and the projector gate means; and the tray having means, including a tray gate opening, for retaining slides in the slots except when a slot is aligned with the tray gate opening, and means cooperable with the projector tray mounting means for assuring alignment of the tray gate opening with the projector opening; the module being characterized in that it comprises:

means cooperable with the projector tray mounting means for mounting the module above the projector in place of the tray;

means for mounting the tray above the module;

module gate means for having a module gate opening for passing a slide between the tray and the projector, through the module;

means, cooperable with the projector tray mounting means and with the tray alignment assuring means, for establishing alignment of the module gate means with both the tray gate means and the projector gate opening;

means for moving the array of slots relative to the means for retaining;

means for controlling the means for moving in accordance with user input for selecting a next slot, corresponding to a desired next slide, to be brought into alignment with the tray gate opening; and means cooperable with the projector lifter foot means, for transporting the next slide between the tray gate opening and the projector gate opening, through the module gate opening, when the next slot has been brought into alignment with the tray gate opening.

10. A module as in claim 9, wherein the means for transporting the next slide comprises means for blocking the passage of slides from the tray gate opening to the module gate opening until the next slot has been brought into alignment with the tray gate opening.

11. A module as in claim 10, wherein the means for transporting the next slide further comprises a module lifter foot, means for moving the module lifter foot in the module gate opening to move the next slide between the tray and the module, and means for removing the module lifter foot away from the module gate opening to move the next slide between the module and the projector.

12. A module as in claim 11, wherein the projector lifter foot means comprises means for lifting a slide out of the projector gate opening after projection, and the means for transporting the next slide further comprises means for moving the removed module filter foot back into the module gate opening to retrieve the lifted next slide from the projector gate opening after projection and to lift the next slide back into the next slot in the tray.

13. A module as in claim 9, wherein the module further comprises sensor means for sensing the position of the array of slots; and user-input means, cooperative with the sensor means, for controlling the means for moving the slots to define the order of sequential alignment of the slots with the tray gate opening.

14. A module as in claim 13, wherein the means for moving the array of slots comprises a hub assembly that projects upwardly, centrally of the module, drive means for rotating the hub assembly, and circuit means connected to control the drive means; and the sensor means comprises means, connected to provide feedback to the circuit means, for sensing the angular position of the hub assembly.

15. A module as in claim 14, further comprising means, responsive to the means for removing the module lifter foot, for locking the means for moving the array of slots while the next slide is in the projector.

16. In combination with a slide projector of the top-loading, gravity-fed rotary type and an associated slide tray having a continuous circular array of serially arranged vertical slots adapted for the sequential physical ordering of slides respectively therein; the slide projector including means for mounting the tray above the projector, projector gate means having a projector gate opening for receiving a slide into the projector from the tray, and lifter foot means cooperable with the projector gate opening for transporting a slide between the tray and the projector gate means; and the tray having means, including a tray gate opening, for retaining slides in the slots except when a slot is aligned with the tray gate opening, and means cooperable with the projector tray mounting means for assuring alignment of the tray gate opening with the projector gate opening; a module for enabling the tray-loaded slides to be randomly accessed for projection by the projector in accordance with a user-selectable slide presentation sequence, the module being characterized in that it comprises:

means cooperable with the projector tray mounting means mounting the module above the projector;

means for mounting the tray above the module;

module gate means having a module gate opening for passing a slide between the tray and the projector, through the module;

means, cooperable with the projector tray mounting means and with the tray alignment assuring means, establishing alignment of the module gate opening with both the tray gate opening and the projector gate opening;

means for moving the array of slots relative to the means for retaining;

means for controlling the means for moving in accordance with user input for selecting a next slot, corresponding to a desired next slide, to be brought into alignment with the tray gate opening; and means, cooperable with the projector lifter foot means, for transporting the next slide between the tray gate opening and the projector gate opening, through the module gate opening, when the next slot has been brought into alignment with the tray gate opening.

17. A combination as in claim 16, wherein the tray has a bottom central opening; the means for moving the array of slots comprises a hub assembly that projects upwardly, centrally of the module, through the bottom central opening; means for keying the array of slots to the hub assembly; drive means for rotating the hub assembly; and circuit means connected to control the drive means; and the module further comprises sensor means, connected to provide feedback to the circuit means, for sensing the angular position of the hub assembly.

18. A combination as in claim 17, wherein the means for transporting the next slide comprises a module lifter foot assembly including a lifter foot; a cam gear assembly; and means for driving the cam gear assembly for moving the lifter foot down in the module gate opening to lower the next slide from the tray to the module, for removing the module lifter foot away from the module gate opening when the next slide has been lowered to the module to enable the next slide to pass to the projector gage opening, for moving the removed module lifter foot back into the module gate opening to retrieve the next slide after it has been returned from the projector gate opening, and for moving the lifter foot up in the module gate opening to lift the next slide, after retrieval, back to the tray gate opening and back into the next slot in the tray.

19. A combination as in claim 18, wherein the module further includes a central post, and the hub assembly and cam gear assembly are mounted for independent coaxial rotation about the post.

20. A combination as in claim 19, wherein the means for controlling the means for moving further comprises the circuit means comprising a microcontroller, a memory and user input means connected to the microcontroller and the memory.

* * * * *